(No Model.)
T. K. S. McGRIFF.
ATTACHMENT FOR BICYCLES.
No. 503,058. Patented Aug. 8, 1893.
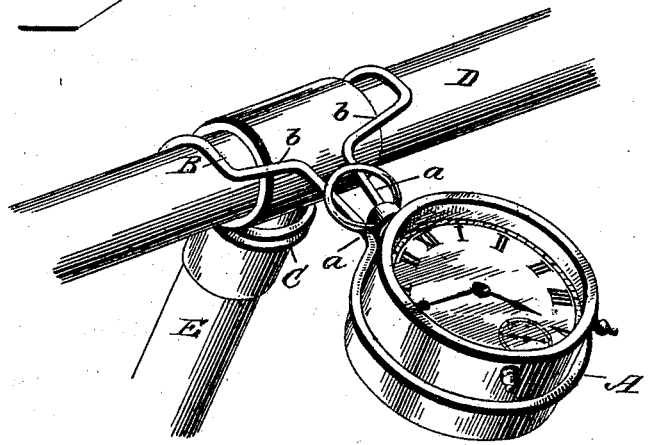
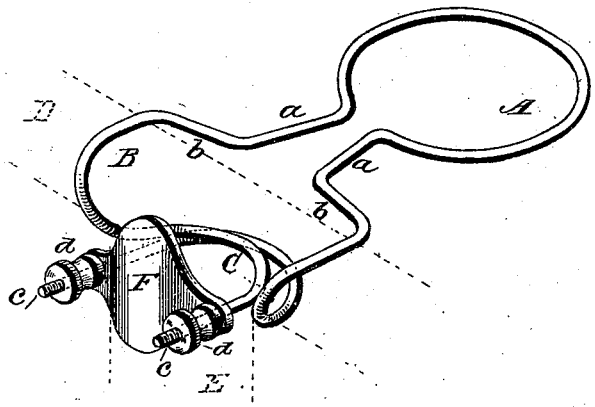
Witnesses
C. J. Williamson
W. J. Bennett
Inventor
Thomas K. S. McGriff,
per Chas. H. Fowler
Attorney.

UNITED STATES PATENT OFFICE.

THOMAS K. S. McGRIFF, OF CHICAGO, ILLINOIS.

ATTACHMENT FOR BICYCLES.

SPECIFICATION forming part of Letters Patent No. 503,058, dated August 8, 1893.

Application filed May 12, 1893. Serial No. 473,950. (No model.)

*To all whom it may concern:*

Be it known that I, THOMAS K. S. McGRIFF, a citizen of the United States, residing at Chicago, in the county of Cook and State of Illinois, have invented certain new and useful Improvements in Attachments for Bicycles; and I do hereby declare that the following is a full, clear, and exact description of the same, reference being had to the annexed drawings, making a part of this specification, and to the letters of reference marked thereon.

The present invention has for its object to provide an attachment to bicycles that can be used for securely holding a clock, lamp, or other like article, such device or attachment being constructed of wire and of such form as to readily hold the article and be securely connected to the handle of the bicycle and readily detached therefrom when not required for use.

The invention consists of a device constructed substantially as shown in the drawings and hereinafter described and claimed.

Figure 1 of the drawings represents a perspective view of my improved device showing it connected to the handle of a bicycle and a clock held in position; Fig. 2 a similar view showing the clock removed and the bicycle handle in dotted lines.

In the accompanying drawings is shown my improved device which is constructed of wire or other suitable material of the required thickness and is bent to form a holding ring A, terminating in shanks *a*, which shanks are bent in an outward direction and laterally to form elbows *b*. From the elbows *b* the wire is bent to form a clamping frame B and a clip C, the frame extending over the handle bar D of the bicycle, and the clip extending around the post or standard E, thus firmly and securely holding the device in position. The ends of the wire terminate in screw threaded extensions *c*, and a clamping plate F has holes for passing it over the screw threaded extensions and is pressed tightly against the post or standard E by means of suitable thumb-nuts *d* which engage with the screw threaded ends of the extensions. The clamping plate F is convex or has a curved bearing surface to conform to the convexity of the post or standard E so that it will better fit against it when forced up by the thumb-nuts *d*.

The device being constructed of wire and bent substantially as shown, provides a very simple and effective means for securely connecting it to the bicycle and also a convenient means of holding in position a clock or lamp or other article.

That portion of the wire forming the holder may be changed or modified to adapt it to the various classes of articles to which it is to hold and any changes or modifications as would come within ordinary mechanical skill may be made without departing from the principle of my invention.

Having now fully described our invention, what I claim as new, and desire to secure by Letters Patent, is—

1. An attachment to a bicycle for holding articles, consisting of a device constructed of wire or other suitable material and having a frame to embrace the handle of the bicycle and a clip to embrace the post or standard thereof, said clip terminating in screw threaded extensions, and a clamping plate and thumb-nuts for forcing the plate against the post or standard, substantially as and for the purpose set forth.

2. An attachment to bicycles for holding articles, consisting of a device formed of wire or other suitable material and bent to form a holding ring, a frame, and a clip, said clip terminating in screw threaded extensions, and a clamping plate and thumb-nuts, substantially as and for the purpose described.

In testimony that I claim the above I have hereunto subscribed my name in the presence of two witnesses.

THOMAS K. S. McGRIFF.

Witnesses:
R. NEVERS,
J. A. HAGSTROM.